Oct. 18, 1960 C. B. KREKELER 2,956,442
MINING MACHINE CHAIN AND PINTLE
Filed Jan. 10, 1958
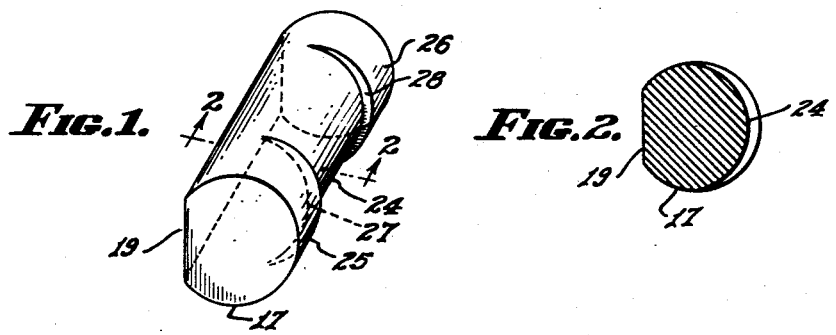
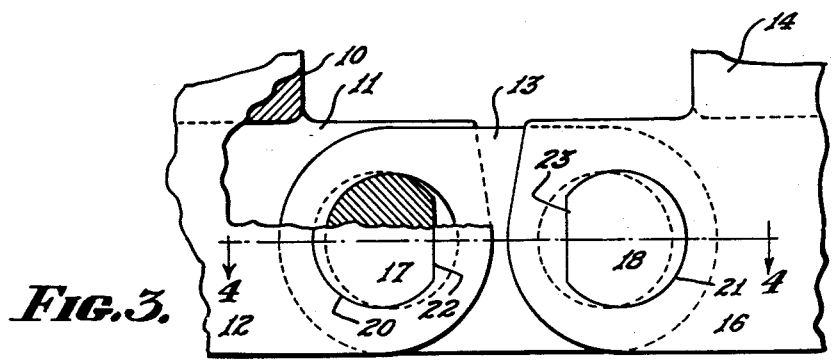
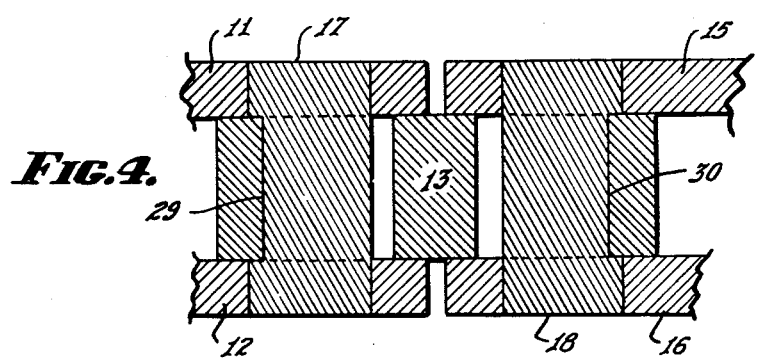
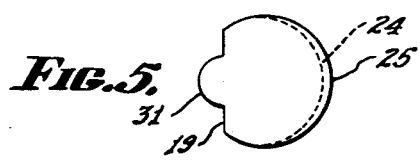
INVENTOR.
CLAUDE B. KREKELER.
BY Allen & Allen
ATTORNEYS.

2,956,442
MINING MACHINE CHAIN AND PINTLE

Claude B. Krekeler, Cincinnati, Ohio, assignor to The Cincinnati Mine Machinery Co., Cincinnati, Ohio, a corporation of Ohio Filed Jan. 10, 1958, Ser. No. 708,291

6 Claims. (Cl. 74—254)

As is well known, mining machine chains have so-called block links which bear socket members in which cutter bits or bit holders are engaged. There are variations of construction. In a common form, the block links have spaced cheeks, these being hingedly joined to connector members which lie between the cheeks. In another modification, the block links have single cheeks, the connector members being double and lying on either side of the single cheek. In yet another modification, each block element has spaced cheeks at one end and a single cheek at the other, the block elements being directly hinged to each other.

Pintles engaging in perforations in the cheek members accomplish the hinging. The invention hereinafter described is applicable to all of these modifications of structure as will readily be understood by the skilled worker in the art. For the purpose of an exemplary disclosure, the invention will be described in connection with the first stated modification, but without limitation.

There are several modifications of mining machinery. In the type which is used to undercut a seam of coal for example, the cutter chain runs in channels about a cutter bar in the form of an arm. In another type a plurality of chains in side by side relationship, passing around a head, are used both to cut the coal and to deliver it to a point where it may be picked up by a conveyer. In either instance, the pintles must not extend beyond the outer surfaces of the outer cheeks, and consequently means must be provided for holding the pintles against endwise displacement which means also do not extend beyond the outer surfaces of the outer cheeks. The chains are driven by sprocket members in the bodies of the mining machines; and in the last mentioned modification they return over sprockets located at the head.

Mining machine chains are subject to extraordinary strains and vibrations in use. Consequently it becomes a problem to make the chains as strong as possible; and this involves the pintle construction, since breakage of pintles is not uncommon. The teeth of the respective sprockets engage in recesses in the chain, usually in the block link members. The sprocket teeth themselves are subjected to great strain and to wearing through abrasion, so that it becomes a problem to provide a chain which will accept the largest possible sprocket teeth while maintaining chain strength as hereinabove set forth.

As a consequence of these considerations it is a primary purpose of this invention to produce a cutter chain having the shortest possible pitch commensurate with over-all chain strength.

It is an object of the invention to provide a chain which will accept a sprocket tooth of larger than average size for a chain of given pitch.

Since chain elements must be frequently renewed, it is an object of the invention to provide a structure in which the pintle may be readily disengaged, and a pintle construction which does not require separate fastening means.

It is an object of the invention to provide a pintle which has a bearing area equal to the largest possible bearing area obtainable with the chosen pintle diameter, which is locked in the chain against rotary movement by its configuration, and which is locked in the chain against longitudinal displacement by the natural forces which are encountered in the use of a cutter chain.

These and other objects of the invention which will be set forth hereinafter or will be apparent to the skilled worker in the art upon reading these specifications, are accomplished by that construction and arrangement of parts of which an exemplary embodiment will now be described. Reference is made to the accompanying drawings wherein:

Figure 1 is a perspective view of the pintle of this invention.

Figure 2 is a sectional view thereof taken along the section line 2—2 of Figure 1.

Figure 3 is a partial elevational view (with certain portions cut away) of a cutter chain assembly employing the pintles of this invention.

Figure 4 is a horizontal sectional view taken along the section line 4—4 of Figure 3.

Figure 5 is an end view of a modified form of pintle which may be employed in the practice of the invention.

In Figure 3 there is illustrated a portion of a mining machine chain including two block link elements, a connector and pintles which hinge these elements together.

The first block link element is shown as having a socket member or block 10 which will be understood to be perforated or otherwise configured to accept the shank of a cutter bit or cutter bit holder (not illustrated). This block link element has spaced cheeks 11 and 12 between which lie an end of an intermediate, single-cheeked connector member 13. The second illustrated block link member also has a socket element 14 and spaced cheeks 15 and 16. These elements are hingedly connected together by pintles 17 and 18 as shown, passing through perforations in the chain linking elements.

It will be understood by the skilled worker in the art that the pintle elements are normally located as near the ends of the cheek members of the chain as is consistent with the required strength of the end portions of these cheek members. Thus, the pitch of the chain cannot normally be increased by merely moving the pintles closer to the ends of the cheek members.

An exemplary pintle is shown in Figures 1 and 2 and designated 17. It is made of cylindrical steel stock. In the particular type of chain chosen for illustrative purposes herein, it is advisable to lock the pintles against rotation with respect to the outer cheeks of the chain structure. This may be done in various ways; but it is preferred to make use of an expedient hitherto known in the art, namely the expedient of providing the pintle with a longitudinal flat 19 and of providing the spaced cheeks of the block chain elements with pintle receiving perforations 20 or 21 which have corresponding flats 22 or 23. It will be noted that the flats in the perforations lie toward the ends of the cheek members 11, 12, 15 and 16.

The central portion of the pintle is cut back as indicated at 24. This cut is eccentric and it has a radius which is the same as the radius of the pintle before the cut is made. End portions of the pintle shown at 25 and 26 are left uncut. They extend longitudinally of the pintle a distance which is equivalent to the thickness of the cheeks 11, 12, 15 and 16. The formation of the cut 24 therefore leaves at its ends shoulders designated at 27 and 28 on the pintle; and the length of the cut portion 24 is substantially equivalent to the width of the connector link 13. The connector link has circular perforations 29 and 30 (Figure 4) of a size to pass the uncut portions 25 and 26 of the pintle.

When the chain is in assembly, as will be evident from Figures 3 and 4, and when the chain is taut as it will be in operation, the actual bearing of the pintles against the connector link will be on the cut surfaces 24 of the pintle. These surfaces, having the same radius as the surfaces 25 and 26, provide all of the bearing surface which a pintle having the same diameter could provide against the connector link in a taut chain; but the relief provided by the cut 24 in the pintle permits a greater separation of the block link elements and hence greater space within these elements for the acceptance of the tooth of a sprocket over which the chain is passing. Furthermore, so long as the chain is taut, the pintles 17 and 18 are held against longitudinal movement by the engagement of the shoulders 27 and 28 against the outer sides of the connector 13, as shown in Figure 4. No separate fastening means for the pintle is required.

The depth of the cut 24 may be varied as desired and will normally increase with the general diameter of the pintle. However, the cut should not be so deep as to bring about any substantial weakening of the pintle. As a guide, but without limitation, it has been found that with a pintle having a diameter of, say, 1⅜ in., a cut 24 which has a maximum depth of about ⅛ in. will satisfactorily serve the purposes of the invention, and will increase the distance between the ends of successive connectors by about ¼ in.

It will be evident to the skilled worker in the art that the pintle hereinabove described may be employed with connector members which have removable and renewable sleeves in their perforations, providing the perforations in the sleeves have a diameter sufficient to pass the pintle.

In the construction hereinabove described, the pintles are easily removed longitudinally, when this is desired, by relieving the tension on the chain. This may be done in various ways as by temporarily shortening the cutter bar or arm over which the chain passes, or in another type of machine by bringing the head sprockets closer to the drive sprockets. Mining machines of both types are normally provided with means whereby chain tension can be adjusted readily, and these are convenient for use in relieving chain tension when it is desired to remove one or more pintles. When chain tension is sufficiently relieved, the pintles may be driven or pushed out of position longitudinally.

In Figure 5 there is illustrated a modified form of pintle. This pintle has the features hereinabove described including the flat 19; but for the purpose of strengthening the pintle, the flat is provided with a rib 31. In this instance the perforations 20 and 21 in the cheeks 11, 12, 15 and 16 will have their flats provided with outwardly extending grooves to pass the rib 31. It would not constitute a departure from the invention to provide a circular pintle devoid of a flat, but having a rib which would serve as means for locking the pintle against rotation. But it is more convenient and in general more accurate as a manufacturing operation to form a full round pintle and then broach or machine a longitudinal flat on it with or without a rib. Where the rib is provided on the flat, the sacrifice in strength is not substantial.

The invention has been described in certain preferred embodiments, but variations are possible. For example, other non-cylindrical configurations than a flat may be employed to prevent the rotation of the pintle with respect to the outer cheeks of the chain elements, providing the pintle will still pass through the perforations of all cheeks when the chain elements are in alignment. Again, where the pintle is given a press fit in the perforations of one or both of the outer cheeks, a pintle with full cylindrical ends can be used. While the pintle of this invention does not require fastening means to prevent endwise displacement, any of the pintle fastening means hitherto employed in the art may be added to the described structure, if desired.

Modifications may be made in the invention without departing from the spirit of it. The invention having been described in an exemplary embodiment, what is claimed as new and desired to be secured by Letters Patent is:

1. A mining machine cutter chain having link members pivoted together by means of pintles, the said link members at the pivot points having respectively a single cheek inner element located between spaced cheek outer elements, the said cheek elements being perforated for the passage of a pintle, and a pintle made from cylindrical stock passing through said perforations, said pintle having at one side a longitudinally extending, recessed, non-cylindrical configuration, the perforation in at least one of said outer cheek elements having a shape to conform to the peripheral surface of an end of said pintle including said non-cylindrical configuration so that when said pintle is in place therein, it will be locked against rotation with respect to the said cheek element with the said non-cylindrical configuration located toward the end of the said cheek element, end portions of the said pintle extending inwardly from the ends thereof a distance substantially equivalent to the thickness of the said outer cheek elements having the original cylindrical shape excepting for said non-cylindrical conformation, and a central portion of said pintle of a longitudinal extent substantially equivalent to the thickness of said inner cheek element being cut back on the side opposite said non-cylindrical conformation, the said cut back portion having a cylindrical surface of substantially the same radius as the radius of the cylindrical surfaces of the end portions of said pintle.

2. In a mining machine chain, link members adapted to be pivoted together by means of pintles, said link members being characterized respectively at the pivot point by a single inner cheek element located between spaced outer cheek elements, said elements at the pivot point being perforated for the reception of a pintle, and a pintle made from cylindrical stock and having a flat on one side, said pintle at each end having a peripheral shape which is cylindrical excepting for said flat, the perforation in at least one of said outer cheek elements having a corresponding flat located toward the outer end of said cheek element whereby when said pintle is in place therein, said pintle is locked against rotation with respect to said outer cheek element, an inner portion of the said pintle on a side opposite the said flat and of a length substantially equivalent to the width of said inner cheek element being cut back to form a recessed cylindrical surface having the same radius as the radius of the cylindrical surfaces of the ends of said pintle.

3. In a mining machine chain, link members adapted to be pivoted together by means of pintles, the said link members being characterized respectively by a single inner cheek element located between spaced outer cheek elements at the pivot point, said cheek elements being perforated for the passage of a pintle when said elements are in longitudinal alignment, a pintle made from cylindrical stock and having end portions of generally cylindrical peripheral shape and having a central portion of substantially the width of said inner cheek element cut back to form a recessed cylindrical surface with an axis displaced from the axis of said pintle but having a radius substantially equal to the radius of the cylindrical surfaces of the ends of said pintle, and means for holding said pintle against rotation with respect to at least one of said outer cheek elements in a position in which said last mentioned cylindrical surface is presented toward the end of said inner cheek element.

4. A pintle for use with a chain in which the several elements are interengaged by the positioning of a single cheek on one element between spaced cheeks on another element with a pintle passing through perforations in the said cheeks, the said pintle being formed from cylindrical stock and having a longitudinally extending flat on one side, end portions of said pintle having a cylindrical peripheral shape excepting for said flat, the said pintle on the side opposite the said flat at its central portion and for a length substantially equivalent to the width of the single cheek element with which it is to be used, being cut back to form a cylindrical surface of substantially the same radius as the radius of the cylindrical surfaces of end portions of said pintle lying beyond the said central portion.

5. The structure claimed in claim 4 in which the said pintle has a rib located substantially centrally of the said flat.

6. In a mining machine cutter chain, a block member having spaced cheeks and a connector member having a single cheek, said cheeks adapted to be pivoted together by means of a pintle, said cheeks at the pivot point being perforated to accept said pintle, and a pintle formed from cylindrical stock and having at one end at least a flattened portion adapted to coact with a shaped perforation in one of the outer cheek elements to lock the said pintle against rotation with respect thereto, end portions of said pintle having a cylindrical peripheral shape excepting for said flattened portion, the said pintle where it passes through the said single cheek element and on the side toward the end of said element being cut back to form a recessed cylindrical surface of substantially the same radius as the radius of the cylindrical surfaces of the ends of said pintle and demarked from the end portions of said pintle by shoulders, whereby the engagement of said single cheek element with said last mentioned cylindrical surface and with said shoulders prevents endwise withdrawal of said pintle.

References Cited in the file of this patent

UNITED STATES PATENTS

| | | |
|---|---|---|
| 1,808,236 | Lerner | June 2, 1931 |
| 2,010,124 | Worrall | Aug. 6, 1935 |
| 2,696,742 | Otto et al. | Dec. 14, 1954 |
| 2,780,109 | McPhee | Feb. 5, 1957 |
| 2,826,085 | Cartlidge et al. | Mar. 11, 1958 |